United States Patent
Litovtchenko et al.

(10) Patent No.: US 9,524,256 B2
(45) Date of Patent: Dec. 20, 2016

(54) REQUEST CONTROLLER, PROCESSING UNIT, ARRANGEMENT, METHOD FOR CONTROLLING REQUESTS AND COMPUTER PROGRAM PRODUCT

(75) Inventors: Vladimir A. Litovtchenko, Munich (DE); Florian Bogenberger, Poing (DE)

(73) Assignee: NXP USA, INC., Austin, TX (US)

( * ) Notice: Subject to any disclaimer, the term of this patent is extended or adjusted under 35 U.S.C. 154(b) by 1369 days.

(21) Appl. No.: 12/527,372

(22) PCT Filed: Feb. 16, 2007

(86) PCT No.: PCT/IB2007/050511
§ 371 (c)(1),
(2), (4) Date: Aug. 14, 2009

(87) PCT Pub. No.: WO2008/099238
PCT Pub. Date: Aug. 21, 2008

(65) Prior Publication Data
US 2010/0030939 A1    Feb. 4, 2010

(51) Int. Cl.
*G06F 13/24*    (2006.01)
*G06F 9/48*    (2006.01)

(52) U.S. Cl.
CPC ............. *G06F 13/24* (2013.01); *G06F 9/4812* (2013.01)

(58) Field of Classification Search
USPC .................................................. 710/260–269
See application file for complete search history.

(56) References Cited

U.S. PATENT DOCUMENTS 4,819,173 A * 4/1989 Brauninger ................... 701/110
4,930,068 A * 5/1990 Katayose et al. ............. 710/261
(Continued)

FOREIGN PATENT DOCUMENTS

| DE | 10160298 | 6/2003 |
| EP | 0497628 | 1/1992 |
| WO | 0052586 | 9/2000 |

OTHER PUBLICATIONS

Definition of Multiplexer, <http://en.wikipedia.org/wiki/Multiplexer>, accessed on Jul. 12, 2010.*
(Continued)

*Primary Examiner* — Khanh Dang

(57) ABSTRACT

An request controller for controlling requests of a processing unit. The request controller may include an request controller input for receiving an request and an request processing unit connected to the request controller input. The request may request to switch a context of said processing unit or to switch the processing unit from a current an operation to another operation. The request processing unit may decide on the request based on a decision criterion. An request controller output may be connected to the request processing unit, for outputting information about at least granted request. The request processing unit may include a control logic unit including: a state input for receiving information about a current state of a system including the processing unit; and a request input for receiving information about a received request. The control logic unit may be arranged to determine whether the received request belongs to the current state of the processor, to grant the request when the received request does belong to the current state and to reject the request in case the request does not belong to the current (Continued)

state. The control logic unit may further include a control logic output for outputting an request grant signal when the request is granted.

20 Claims, 3 Drawing Sheets

(56) References Cited

U.S. PATENT DOCUMENTS

| | | | |
|---|---|---|---|
| 5,392,435 A * | 2/1995 | Masui et al. | 710/260 |
| 5,423,049 A | 6/1995 | Kurihara | |
| 5,535,397 A | 7/1996 | Durante et al. | |
| 5,542,076 A | 7/1996 | Benson et al. | |
| 5,805,883 A * | 9/1998 | Saitoh | 718/105 |
| 5,805,902 A * | 9/1998 | Kikinis et al. | 710/261 |
| 5,931,936 A | 8/1999 | Chung et al. | |
| 6,065,089 A | 5/2000 | Hickerson et al. | |
| 6,185,639 B1 * | 2/2001 | Kailash et al. | 710/48 |
| 6,216,182 B1 | 4/2001 | Nguyen et al. | |
| 6,889,277 B2 | 5/2005 | Musumeci | |
| 7,082,486 B2 * | 7/2006 | DeWitt et al. | 710/260 |
| 7,099,977 B2 * | 8/2006 | Chong et al. | 710/262 |
| 7,120,717 B2 * | 10/2006 | Vu | 710/262 |
| 7,124,225 B2 * | 10/2006 | Yao | 710/266 |
| 2002/0161961 A1 | 10/2002 | Hardin et al. | |
| 2003/0056047 A1 | 3/2003 | Connor et al. | |
| 2005/0102458 A1 | 5/2005 | Ober et al. | |
| 2005/0177668 A1 | 8/2005 | Kimelman et al. | |
| 2005/0246465 A1 | 11/2005 | Wright et al. | |
| 2006/0211415 A1 * | 9/2006 | Cassett et al. | 455/423 |
| 2008/0140895 A1 * | 6/2008 | Baker et al. | 710/262 |
| 2010/0011142 A1 * | 1/2010 | Bogenberger et al. | 710/260 |

OTHER PUBLICATIONS

Intersil, "82C59A Priority Interrupt Controller", Application Note, Apr. 1999.
Florian Bogenberger et al., U.S. Appl. No. 12/526,306, filed Aug. 7, 2009 from International Application No. PCT/IB07/50420.
International Search Report and Written Opinion correlating to PCT/IB2007/050511, dated Oct. 19, 2007.
Non-Final Office Action mailed Aug. 30, 2012 for U.S. Appl. No. 12/526,306, 9 pages.

* cited by examiner

REQUEST CONTROLLER, PROCESSING UNIT, ARRANGEMENT, METHOD FOR CONTROLLING REQUESTS AND COMPUTER PROGRAM PRODUCT

FIELD OF THE INVENTION

This invention relates to a request controller, a processing unit, an arrangement, a method for controlling requests and a computer program product.

BACKGROUND OF THE INVENTION

In a typical data processing system, when in operation, a processing unit performs a certain task. The task may, for example, be the execution of a series of instructions defined by, for example, a computer program. Other devices or computer programs can have the processing unit perform requested services by generating requests, such as interrupt requests.

An interrupt request may for example be transmitted by a peripheral device to the processing unit. The interrupt request may for example be sent by an external memory device, such as a hard-disk, to signal the completion of task, such as a data transfer from or to the peripheral. Also, the interrupt request may for example be used to transmit information to the processing unit. For instance, a system timer may periodically transmit interrupt requests which can be used by the processing unit to establish a time-base.

The interrupt requests are propagated to an interrupt controller via multiple interrupt request lines. Once the interrupt controller identifies an active interrupt request line, it may grant the interrupt request and send an interrupt signal to the processor. In response to the interrupt signal, the processing unit will interrupt the task being performed and perform a sequence of steps, generally referred to as an interrupt handler or interrupt service routine, associated with the requested interrupt A general problem associated with the use of interrupts is that the processing unit may be overloaded with the interrupt service routines. To prevent the processing unit from being overloaded with the processing of interrupt requests, several solutions are known.

U.S. Pat. No. 6,065,089 discloses a processor system which includes a master processor and a slave processor. In response to a command from the master processor, the slave processor will generate an interrupt and send the interrupt to the master processor. The interrupt is delayed by a certain amount of time. The amount of time is controlled by a counter, which is decremented after a task is finished and incremented if a new task is initiated.

U.S. Pat. No. 5,931,936 discloses a processor system which includes an interrupt controller. The interrupt controller uses a priority-decision mechanism to schedule interrupts.

Furthermore, Intersil Application Note AN 109, titled: "82C59A Priority Interrupt Controller" discloses an operation of an interrupt controller which is based on enabling/disabling interrupts and prioritizing interrupts.

However, a common disadvantage of the solutions provided in these prior art documents is that risk exists to the processing unit to be overloaded with processing requests routines. An interrupt request transmitted due to an error in a device connected to the processing unit will not be inhibited, instead those interrupt requests are put either into interrupt queues with low priorities assigned or their propagation to the processing unit is delayed. A further disadvantage is that, although these solutions limit the number of interrupts being sent to the processing unit, they do not prevent an overflow of the processing unit caused by e.g. the amount of processing the processing unit has to perform to execute the interrupt handlers of the granted interrupt requests.

SUMMARY OF THE INVENTION

The present invention provides a request controller, a processing unit, an arrangement, a method for controlling requests and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

In the following, by way of example only, an embodiment of a request controller is described which is implemented as an interrupt controller. However, the request controller may be implemented to control other types of requests. For example, the request may be a request to switch a context of a processing unit or to switch a processing unit from a current an operation to another operation. The request controller may for example control interrupt requests and/or context switch requests and/or task switch requests and/or thread switch requests and/or process switch requests and/or other suitable types of requests. Accordingly, although in the description of the example below, the terms 'interrupt' and 'interrupt request' are used, these may be replaced by the more general term 'request', or depending on the specific implementation, by one of more of the terms: 'context switch request', 'task switch request', 'thread switch request', 'process switch request'.

Figure 1:
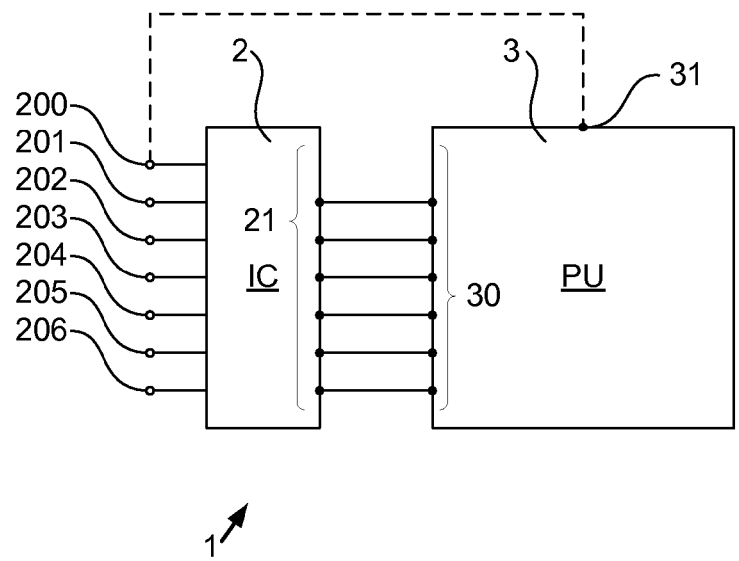
FIG. 1 schematically shows a block diagram of an example of an embodiment of a processor assembly.

Referring to FIG. 1, an example of an embodiment of a processor assembly 1 is schematically shown therein. The processor assembly 1 may, as shown in FIG. 1, include an interrupt controller (IC) 2 and a processing unit (PU) 3. Although in FIG. 1 only one IC 2 and one PU 3 are shown, the processor assembly 1 may include two or more ICs 2 and/or two or more processing units 3. For example, the processor assembly 1 may include a plurality of processing units 3 connected to the same IC 2 or include a plurality of processing units 3 connected to different ICs 2.

The interrupt controller 2 may be connected to the processing unit 3. As shown in the example of FIG. 1, for instance, one or more controller outputs may be connected to an interrupt input 30 of the processing unit 3. (In FIGS. 1 and 2, for illustrative purposes, several separate controller outputs 21 and interrupt inputs 30 are shown, each serving for a separate type of interrupt request, however it will be appreciated that more or less interrupt inputs 30 and controller outputs 21 may be present and/or different types of interrupt requests may be outputted at the same controller output 21 and/or inputted to the same interrupt inputs 30.)

The interrupt controller 2 may include one or more interrupt controller inputs 200-206 (which may also be referred to as interrupt request lines). In the example of FIG. 1 seven are shown, however the IC 2 may include more or less inputs).

As is indicated with the dashed line in FIG. 1, an interrupt request output 31 of the processing unit 3 may be connected to an interrupt controller input 200. The interrupt controller 2 may receive one or more interrupt requests (IR) of one or more types. For example, at each of the interrupt controller inputs 200, 201, . . . a respective type of interrupt request $IR_1$, $IR_2$, . . . may be received.

The (interrupt) request may be of a type suitable for the specific implementation, and for example be of a type that is sent periodically and/or in a predictable manner. Also, the interrupt request may be of a type that is sent a-periodically and/or in an unpredictable manner. The interrupt requests may for example be sent by other devices connected to the interrupt controller inputs 200-206. For example, each device may be connected to a respective one of the controller inputs 200-206, thus allowing to determine the source of the interrupt request from the input 200-206 at which the interrupt request is received. An interrupt request IR may for example sent by another device (not shown in FIG. 1) in order to transmit or receive data from or to the processing unit 3. The interrupt request may also be sent by the processing unit 3 and may, for example, be generated by the processing unit 3 when executing instructions of a computer program.

The interrupt request may for example be sent, via the interrupt request output 31, by the processing unit 3 to the controller input 200 in response to an interrupt command included in the computer program. In response to an interrupt request IR, the processing unit 3 may for example store the computer program and the data being processed by the processing unit 3 in a memory. The processing unit 3 may also execute a sequence of steps, known as an interrupt handler (IH), to service the interrupting device. The processing unit 3 may for instance process received data in response to an interrupt request IR, perform one or more calculation(s) in response to an interrupt request or perform other operations.

After the interrupt handler IH has been executed, the processing unit 3 may retrieve the stored computer program and the stored data from the memory and resume the task which was being performed at the point in time the interrupt request IR was received.

The interrupt controller 2 may control the interrupts requests IR received at the interrupt controller inputs 200-206. The interrupt controller 2 may for example receive an interrupt request IR and decide to grant or deny an interrupt request IR based on a comparison of the request with one or more predetermined criteria. The interrupt controller 2 may, for example, forward an interrupt request to the respective processing unit 3 when the interrupt request IR is granted or inhibit the transfer of the interrupt request to the processing unit 3 when the request is denied, for example by discarding the interrupt request.

Figure 2:
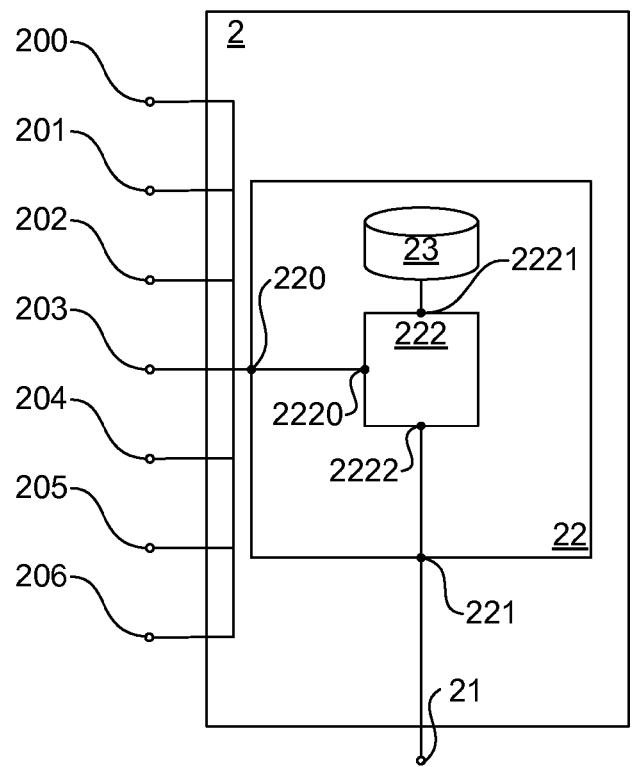
FIG. 2 schematically shows a block diagram of a first example of an embodiment of an request controller.

Referring to FIG. 2, the interrupt controller 2 may for example include one or more interrupt controller inputs 200-206, an interrupt request processing unit 22 and an interrupt controller output 21. At one or more of the interrupt controller inputs 200-206 interrupt requests (IR) may be received. The interrupt request processing unit 22 may decide on the interrupt request based on at least one decision criterion. Information about one or more granted interrupt requests may be outputted at the interrupt controller output 21.

As shown in the example of FIG. 2, the interrupt request processing unit 22 may for instance be connected with a processing input 220 to one or more of the interrupt controller inputs 200-206. For sake of clarity, in the example of FIG. 2, the interrupt controller inputs 200-206 are shown connected to a single interrupt request processing unit 22. However, the interrupt controller 2 may include two or more interrupt request processing units. For instance, each of the interrupt controller inputs 200-206 may be connected to a separate interrupt request processing unit and to a separate interrupt controller output 21.

A processing output 221 may be connected to the interrupt controller output 21. The interrupt request processing unit 22 may receive, via the processing input 220, the interrupt request IR and decide on the interrupt request. When the interrupt request processing unit 22 has decided to grant interrupt request, the interrupt request processing unit 22 may output at the processing output 221 a signal, from hereon referred to as the request grant signal, indicating that the interrupt request is granted.

The request grant signal may for example include the interrupt request, in which case the interrupt request processing unit 22 may be regarded as forwarding the interrupt request, when the interrupt request is granted, to the interrupt controller output 21. A device connected to the interrupt controller output 21, such as the processing unit 3, may receive the request grant signal and in response to the request grant signal initiate processing the interrupt request. For example, in case the request grant signal includes the interrupt request, the processing unit 3 may process the received interrupt request.

As shown in the example of FIG. 2, the interrupt request processing unit 22 may include a control logic unit 222. The control logic unit 222 may include a request input 2220 and a state input 2221. At the state input 2221 information about a current state (CS) of the system in which the processing unit 3 is included may be received. As shown in the example of FIG. 2, the state input 2221 may for example be connected to a memory 23 in which state information is stored and the control logic unit 222 may retrieve data stored in the memory 23 via the state input 2221.

At the request input 2220 information about a received interrupt request may be received. For example the interrupt request itself may be inputted to the control logic unit 222. However, between the interrupt controller inputs 200-206 and the control logic unit 222, other units may be present which for example derive information from the received interrupt request, such as the source and/or the type of interrupt request and forward the determined information to the control logic unit 222. The information may for example be derived by determining the interrupt controller at which the request is received.

The control logic unit 222 may determine whether the received interrupt request belongs to the CS of the system in which the processing unit 3 is included. When the received interrupt request belongs to the CS, the control logic unit 222 may grant the interrupt request. The control logic unit 222 may reject the interrupt request in case the interrupt request does not belong to the CS.

The control logic unit 222 may include a control logic output 2222. At the control logic output 2222 the request grant signal may be outputted when the interrupt request is granted.

In operation, the interrupt controller 2 may perform a method as follows. An interrupt request may be received, for instance at a respective controller input 200-206. The received interrupt request may be forwarded to the interrupt processing unit 22 and be inputted to the control logic unit 222. The control logic unit 222 may retrieve, via the state input 2221 information about the CS of the system in which the processing unit 3 is included.

The control logic unit 222 may determine whether or not the received interrupt request belongs to the CS or not. In case the received interrupt request does not belong to the CS, the interrupt request may be rejected by the control logic unit 222. In case the interrupt request is found to belong to the CS, the interrupt request may be granted and the request grant signal can be outputted by the control logic unit 222. The request grant signal may include the respective interrupt request. However, it is also possible that the request grant signal includes an identification of the interrupt request, in case e.g. the processing unit 3 is able to receive the interrupt request without passing through the interrupt controller Since interrupt requests that do not belong to the CS may be rejected, the number of incorrect interrupts may be reduced. Also, the interrupt controller 2 may operate independent from the processing unit 3, since the state of the system in which the processing unit 3 is included, and hence the interrupts granted by the interrupt controller 2 can be determined by the received interrupt requests. Thereby, the amount of processing capacity of the processing unit 3 available, e.g. for running a computer program, may be increased significantly.

As is explained below in more details, when an interrupt request is granted, this may cause a transition to a following state and the following state may be used to decide on a following interrupt request.

Without wishing to be bound to any theory, it is found that in many applications a mutual correlation exists between interrupt requests and the state of the system in which the processing unit 3 is included. For example, the sequence of interrupts and/or other parameters such as the maximum interrupt rate may at least be partially dependent on the state and/or interrupts may cause a change of the state. Without wishing to be bound to any theory, it is believed that a reason for this frequent correlation between interrupts and the state is that the environment surrounding a processing unit 3, that is the request generating devices connected to the processing unit, usually forms a system that follows specific state patterns with temporal and/or causal correlation.

Accordingly, a model of the state patterns, such as a control graph, may be made and be used by the request controller to grant or deny requests. Furthermore, since the state of the system in which the processing unit 3 is included depends on the requests, the request controller can autonomously determine from the received requests the state the system is in.

Also, without wishing to be bound to any theory, it has been found that in many applications, for a given state of the system in which the processing unit 3 is included, the interrupt requests that will be received during a correct functioning can be predicted. It has further been found that a significant number of unexpected interrupt requests is transmitted due to an error, hence is an incorrect interrupt request which may cause a failure of the processing unit 3 or of the system in which the processing unit 3 is included. Accordingly, such an incorrect incorrect interrupt request can be rejected by the interrupt controller 2. Thus, without wishing to be bound to any theory, in case an interrupt request is received that does not belong to the CS, it implies that the expected sequence of interrupt requests to which the interrupt controller 2 was configured, is broken due to some failure. Accordingly, rejecting such an incorrect interrupt request may prevent the occurrence of an error in the processing unit 3.

For example, the processing unit may form part of an engine control system, for example to control the ignition of the cylinders of an Otto-Motor. The state of the interrupt generating devices may follow the operation of the combustion engine, and the generated interrupts may correlate with the stages of the combustion cycle. For instance, an interrupt request may be generated by a device after finishing a certain operation in the combustion cycle and/or a device may initiate a certain operation (e.g. ignition) after an interrupt request has been sent and processed by the processing unit. For example, the engine control system may include ignition controller which control the ignition of cylinders $C_1, C_2 \ldots C_N$. Accordingly, order of the interrupt requests from the different ignition controllers will correspond to the order the cylinders $C_1, C_2 \ldots C_N$ are When the interrupt request is rejected because it does not belong to the CS, the control logic unit 222 may output an illegal interrupt request (IIR) signal at the control logic output 2222. Thereby, for example the processing unit 3 may be informed about rejected interrupt request and, in response to the illegal interrupt request signal, execute a routine suitable for the type of rejection. For instance, in response to receiving an illegal interrupt request signal, the processing unit 3 may execute a diagnostic routine to find out whether an error has occurred in the source of the interrupt request and how the error can be solved.

The control logic unit 222 may determine whether the received interrupt request belongs to the current state in any suitable manner. The interrupt controller 2 may for instance include a current state indicator, which can indicate the state of the interrupt controller 2. As for example shown in FIG. 3, the current state indicator may include a memory 236, from hereon referred to as the state memory 236, in which an identification of the CS is stored. The state memory 236 may for example identify a CS in terms of the last interrupt request that has been granted or in any other suitable manner. For instance, the request controller 2 may include a memory in which information about previous states of the system, for instance in terms of a sequency of interrupt requests, are stored and from the sequence of previous states and the current state determine the position in a flow of states.

Figure 3:
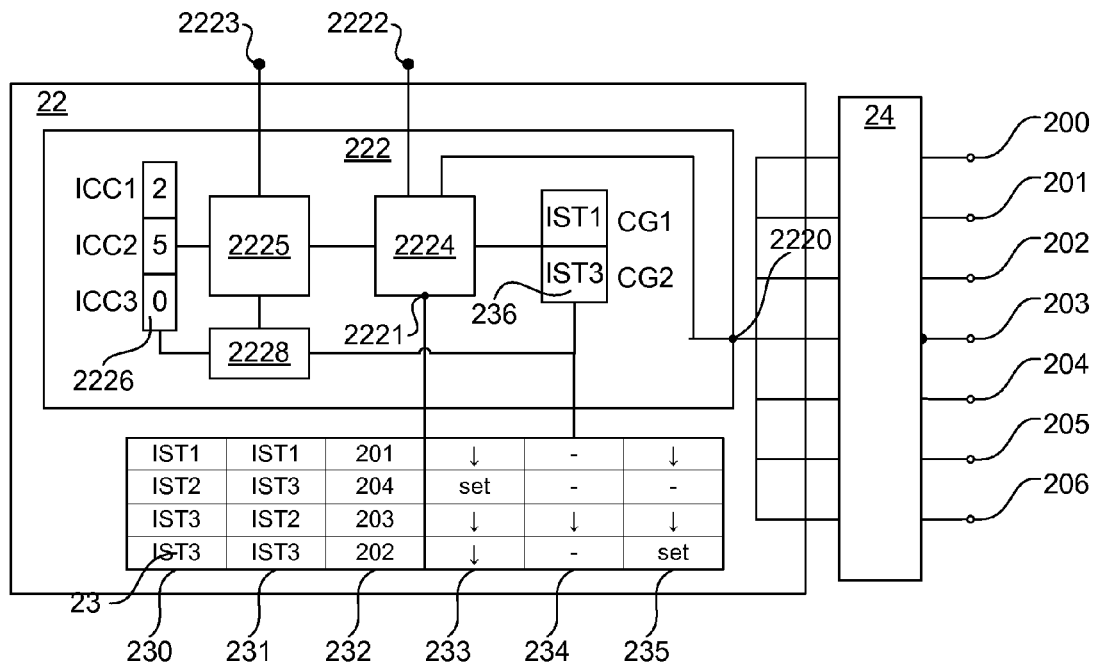
FIG. 3 schematically shows a block diagram of a second example of an embodiment of an request controller.

The state memory 236 may for example include data which represents different parameters of the CS, such as for example an identification of the state for two or more independent sequences CG1, CG2 of interrupt requests. As shown in FIG. 3, the state memory 236 may for example identify that the CS of a first sequence CG1 of interrupts is an interrupt request of type IST1 and that the CS from a second sequence CG2 of interrupts is an interrupt request of type IST3.

As shown in FIG. 3, the interrupt controller 2 may for instance include a state controller 2224 connected to the current state indicator, e.g. the memory 236. The state controller 2224 may for example change the CS to a next state (NS) when an interrupt request is granted. The state controller 2224 may for example change the CS indicated in the memory 236 to a next state NS, for example by setting the identification of the next state in accordance to the granted interrupt request.

The control logic unit 222 may further include a memory 23, from hereon referred to as the interrupt control memory 23, in which data representing allowed states are stored and an indication of the type(s) of interrupt request belonging to an allowed state. The memory 23 may for example include a model of states of the processing unit. In the memory 23, for example data representing a control graph that abstracts the logic flow of an application may be stored. The control graph may allow to detect interrupts which are not allowed in the current application state, as well as interrupts which occur too often. Thereby, faults in the system surrounding the processing unit 3 may be detected and to the maximum load of the PU with interrupt handling may be limited.

As shown in FIG. 3, the interrupt control memory 23 may for example include CS data 230 which defines allowed states of the interrupt controller 2, for instance in terms of interrupts service routines that are being processed in a certain allowed state IST1-IST3.

Figure 4:
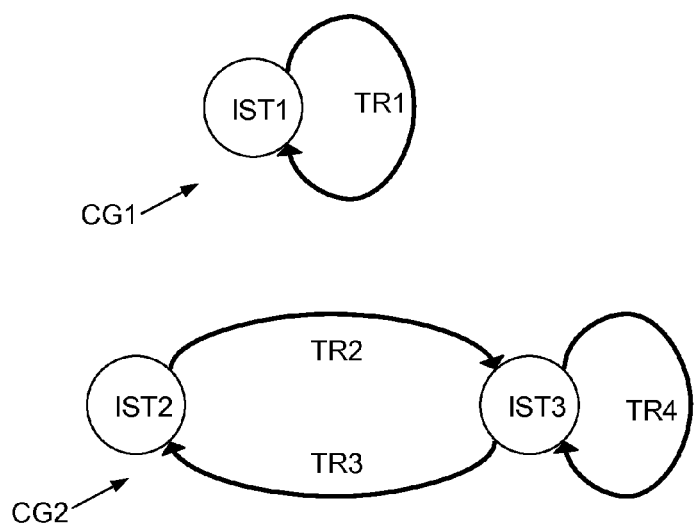
FIG. 4 shows a diagrammatic view of example sequences.
Figure 5:
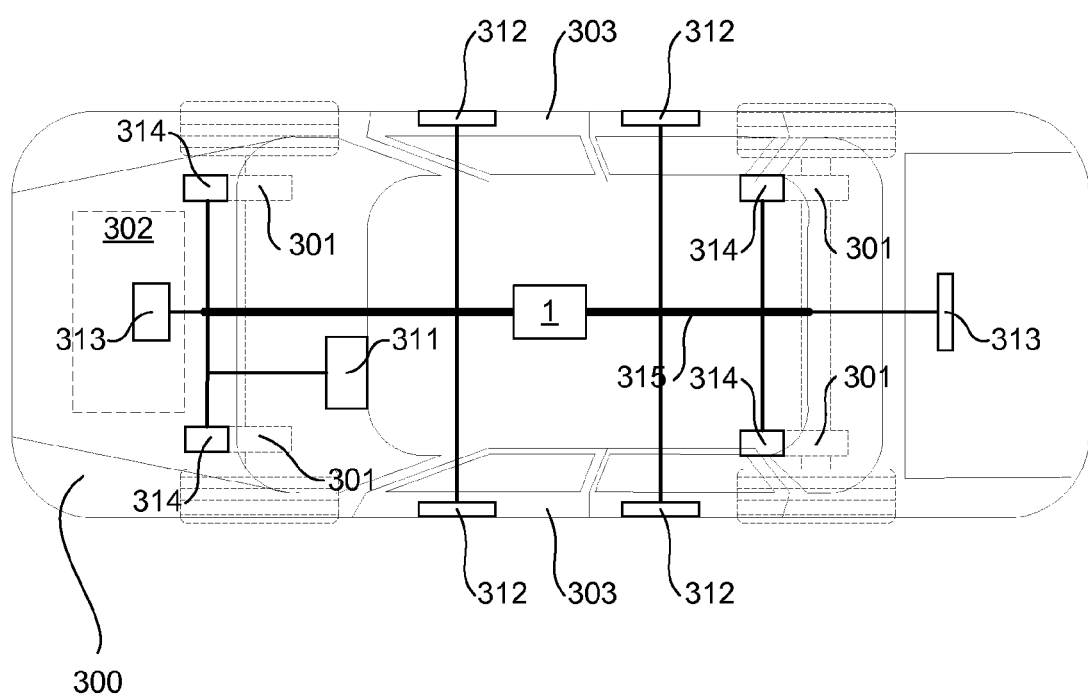
FIG. 5 shows a schematic top-view of an example of a vehicle provided with an example of a processor.

For example, as illustrated in FIG. 4, a processing unit 3 may, when operating, receive interrupt requests originating from two or more independent processes and the processing unit 3 may have two or more independent sequences CG1, CG2 of states IST1-IST3. For instance, a first sequence CG1 may have for a current state IST1 a transition Tr1, for example triggered by an interrupt request at an interrupt controller input 201, to a following state of the same type as the current state.

Thus, in the interrupt control memory 23 a definition, which may also be referred to as a 'control graph', of the sequence CG1 may be stored, which defines that if for a current state IST1, reception of an interrupt request at an interrupt controller input 201 causes the transition TR1 (and hence that for this sequence CG1, this interrupt request belongs to the current state IST1 and other interrupt request, such as those received at the other interrupt controller inputs 202,202-206 do not belong to this state), while after the transition TR1 the next state will be the same state as the current state IST1. During the transition TR1, the interrupt controller 2 may perform some operations, such as manipulating counters ICC1-ICC3, in accordance with settings stored in the memory 23.

Also, for example, a second sequence CG2 may have two or more different states IST2, IST3. Different transitions to a following state may be possible, depending on the type of interrupt request that is processed in a current allowed state. As for example shown in FIG. 4, for instance when CS is IST2, the transition Tr2 to the following state will be to a next state (NS) IST3. On the other hand, when the CS is IST3, two transitions Tr3,Tr4 are possible. A transition Tr3 from the CS IST3 to NS IST2 and a transition Tr4 from an CS IST3 to a NS IST3. Accordingly, in the memory 23, for example the possible states IST1,IST2,IST3 may be stored, associated with the states IST1 resp. IST3 resp. IST2,IST3 which can follow a state and the interrupt requests that may trigger a transition.

In the memory 23, for example, a table ICT may be stored with fields 231-233 from which the types of interrupt requests belonging to the CS can be determined. The table ICT may further include fields 230,231 from which, for example, allowed transitions can be determined, that is transition from an allowed current state to a following state associated with the respective allowed current state. As shown in FIG. 3, the table ICT may for example include a CS field 230 which indicates allowed current states and a next state (NS) field 231 which defines the NS may follow a given CS. Furthermore, in field 232. The table ICT may further include a triggering interrupt field 232, in which the type of interrupt request is defined that may trigger a transition from a CS to a NS. The table ICT may further include fields 233-235 which define operations that a counter controller 2228 may perform on values ICC1-ICC3 stored in a counter memory 2226.

The state controller 2224 may use the data stored in the interrupt control memory 23 to determine whether a received interrupt request belongs to the current state. As shown in FIG. 3, for example, the state transition controller 2224 may for instance be connected to the request input 2220 to receive an interrupt request. The state transition controller 2224 may be connected to the memory 23 and to the state memory 236.

The state controller 2224 may for instance compare a received interrupt request IR(x) with the data stored in the memory 23 and deny the interrupt request IR(x) in case there is no allowed current state to which interrupts requests of the type received belong. The state transition controller 2224 may, for example, determine allowed transitions from the CS to an NS and determine whether the interrupt request is associated with an allowed transition and rejecting the interrupt request IR(x) when the interrupt request is not associated with an allowed transition. For instance in the example of FIG. 3, the state controller 2224 may for example determine from the table ICT whether or not the interrupt request IR(x) is associated with a transition from one of the current states to a next state.

For example, the state transition controller 2224 may check in the table ICT for a row in which the CS field 230 corresponds to the CS and for which the Triggering Interrupt field 232 corresponds to the received interrupt requests. In case such a row is found, the controller may grant the request and set the CS to the NS identified in the row. Before granting the request, the state transition controller 2224 may also perform one or more additional checks. For instance, the state transition controller 2224 may update the counter values ICC1-ICC3 as defined in the respective row of the table ICT and check if the difference between the counter values ICC1-ICC3 and a threshold value TV (TV may for example be zero) does not equal zero. If for one of the counter values the difference is zero, the interrupt request controller may deny the interrupt request.

The state controller 2224 may for example perform an operation which may be described with the pseudo code:

```
when (IR(x)=true)
get CS[j]
find i for which (ICT[i][CS] = CS[j]) AND ( ICT[i][interrupt request] = x)
if i= empty
then deny interrupt IR(x)
else
{
  update [ICC1-ICC3]
  if ICC1 or ICC2 or ICC3 = zero
  then deny interrupt IR(x)
  else
  {
  grant interrupt IR(x)
  CS[j]=NS[i]
  }
}
``` in which IR(x) is true when an interrupt request is received, CS[j] indicates the current state, ICT[i] indicates the i-th row in the table ICT, [CS] indicates an field defining an allowed current state, [interrupt request] indicates an field defining an allowed interrupt request and NS[i] indicates a field defining the next state for the allow current state.

In addition to determining whether the interrupt request belongs to the CS, one or more other aspects of the interrupt request may be compared with a predetermined criterion to determine whether or not the interrupt request will be granted. The interrupt request may for example be granted only when all the predetermined criteria are satisfied. The other aspect may for example the number of granted interrupt requests, for instance per period of time.

As shown in the example of FIG. 3, the interrupt controller 2 may for example include one or more counters. The counter(s) may count a number of granted interrupts. For instance, the interrupt controller 2 may include two or more counters (in the example of FIG. 3, three counter values ICC1-ICC3 are shown), each counting the number of interrupts of a specific type. One or more of the counters may for instance be an up-counter or be a down-counter. (In this respect, an up-counter increments the counter value when an interrupt has been granted, whereas a down-counters decrements the counter value when an interrupt has been granted.) The counters may change with the states. Thereby, only a limited number of counters may be required and only a small amount of memory may be required.

The counter(s) may be implemented in any manner suitable for the specific implementation. The counters may, as shown in FIG. 3, include a counter memory 2226 in which one or more counter values ICC1-ICC3 are stored. The counter memory 2226 may be connected to, for instance, a component of the control logic unit 222. In the example of FIG. 3, the counter memory 2226 is for instance connected to a comparator 2225 and to a counter controller 2228, as is explained below in more detail.

The interrupt controller 2 may include a comparator 2225. As shown in the example of FIG. 3, the comparator 2225 may for instance be implemented in the control logic unit 222. The comparator 2225 may compare a counter value ICC1-ICC3 of the counter with a counter threshold value. As shown in the example of FIG. 3, the comparator 2225 may for instance be connected to the counter memory 2226 and compare a counter value for the received type of interrupt request which has been stored in the memory 2226 with the threshold value.

The threshold value may be set to any value suitable for the specific implementation. The threshold value may for example be set such that the amount of interrupts, when granted, would not overload the processing unit 3, e.g. the amount of processing involved in handling the granted interrupts would be less than the available processing capacity of the processing unit 3. The processing unit 3 may for example periodically reset the counter value and/or the threshold value, to adjust the number of interrupts per period of time to the amount of processing capacity available in the processing unit 3 for servicing the interrupt request. Thereby, for instance, the risk that processing unit 3 is overloaded when the available processing capacity changes may be reduced.

The comparator 2225 may be arranged to compare the counter value ICC1-ICC3 with one or more criteria in order to grant or reject the interrupt request. The comparator 2225 may for instance grant the interrupt request in case the difference between the counter value ICC1-ICC3 and the counter threshold value meets a request grant criterion. For instance, the respective counter may be a down-counter and the comparator 2225 may grant an interrupt request in case the respective counter value is larger than a threshold lower than an initial counter value, for example in case the respective counter value is higher than zero. Alternatively, in case the respective counter is an up-counter the threshold value may be higher than an initial counter value. The comparator may then grant an interrupt request in case the respective up-counter has a value lower than the threshold value. When an interrupt request is granted, the comparator 2225 may output a request granted signal to an output 2223 of the control logic unit 222, to which output 2223 the comparator 2225 is connected. The output 2223 of the control logic unit 222 may for example be connected to the controller output 21. Hence, the request granted signal can be transmitted to the exterior of the interrupt controller 2

As shown in the example of FIG. 3, the control logic unit 222 may for instance include a state controller 2224, as has been explained above. The state controller 2224 may output at the control logic output 2222 the Illegal Interrupt Request (IIR) signal in case the interrupt request is rejected, for instance to the processing unit 3 or other device outside the interrupt controller 2. The state controller 2224 may for instance transmit the request grant signal to the comparator 2225 in case an interrupt request is found to belong to the CS, and hence may in principle be granted. (Without transmitting the request grant signal via the output 2222 to the output 21 of the interrupt controller 2, and hence keeping the request grant signal internal). In response to the request grant signal, the comparator 2225 may, for instance, compare the relevant counter value(s) with the threshold value, and output the request grant signal to the exterior of the interrupt controller 2 in case the comparison meets the predetermined criterion.

The comparator 2225 may reject the interrupt request when the interrupt request does not meet the interrupt request grant criterion. The comparator 2225 may for instance reject the interrupt request in case the difference between the counter value and the counter threshold value does not meet the interrupt request grant criterion and output an interrupt overflow signal when the interrupt request is rejected. For example, the interrupt request might be rejected because the difference between the respective counter value and the threshold value does not meet the predetermined criterion.

The comparator 2225 may output a signal, from hereon referred to as the interrupt overflow signal, which indicates that too many interrupt requests have been received (or granted), in case the comparator 2225 rejects the interrupt request. As shown in the example of FIG. 3, the comparator 2225 may for example be connected to the output 2223 and present the interrupt overflow signal to the output 2223. The output 2223 may be connected to another device, for example to the processing unit 3. In response to the interrupt overflow signal, the processing unit may execute a diagnostic routine to find out whether an error has occurred and how the error can be solved. For instance, the processing unit 3 may check the information in the memory 23 to determine, possible reasons or sources of the failure.

The control logic unit 222 may adjust the stored counter values in case, for example, an interrupt is granted. The control logic unit 222 may for instance increment of decrement the counter values. As shown in the example of FIG. 3, the interrupt controller 2 may for instance include a counter controller 2228. The counter controller 2228 may perform a predetermined operation on the counter value when the interrupt request is granted. As shown in the example of FIG. 3, the counter controller 2228 may be connected to the counter memory 2226 to perform the predetermined operation.

The predetermined operation may for example be dependent on the transition TR from the CS that is caused by the received interrupt. For example, in the memory 23 data may be stored which indicate which predetermined operation(s) is(are) associated with the transition TR from the CS that is caused by the received interrupt. The counter controller 2228 may be connected to the memory 23 and determine from the stored data the operation. For example, the table ICT in the memory 23 may for instance include one or more counter control fields 233-235. The counter control filed 233-235 may specify for the respective counters the predetermined operation to be performed, by the counter controller 2228, with the counter value, e.g. to decrement ($\downarrow$), to leave unchanged (−) or to reset (set) a certain counter value ICC1-ICC3. As for example shown in FIG. 3, the data in the memory 23 may for example define that a first counter value ICC1 may be decremented (as indicated with the arrow pointing down), a second counter value ICC2 may remain unchanged (as indicated in FIG. 3 with the dash), and a third counter value ICC3 may be decremented as well, when an interrupt IST1 is processed in the CS and a transition to a following state in which an interrupt IST1 of the same type is processed.

However, other predetermined operations may also be performed, and for instance one or more of the counter values may be set to a certain value (as indicated in FIG. 3 with the word 'set'). The counter controller 2228 may receive information indicating what the current state of the interrupt controller is, for example from a state memory 236 in which data is stored which represents the CS. The counter controller 2228 may determine from the information in the memory 23 and the current state which predetermine operation may be performed with the counter value and operate correspondingly.

As shown in FIG. 3, the interrupt controller 2 may include an interrupt decoder 24 connected to two or more of the interrupt controller inputs 200-206. As shown in the example of FIG. 3, the interrupt decoder 24 may for example connect the interrupt controller inputs 200-206 to the request input 2220. The interrupt decoder 24 may select from two or more interrupt request receiving during the same period of time a selected interrupt request. Thereby, the flow of interrupt requests to the control logic unit 222 may be limited. Accordingly the risk that the control logic unit 222 is overloaded may be reduced.

The interrupt decoder 24 may for example determine which type of interrupt request is the most urgent or select the selected interrupt request base on another criterion. For instance, the interrupt decoder may enable interrupt requests received at a first input 200 to be inputted to the control logic unit 20 for a first period of time, and inhibit the interrupt requests received at a first input 200 and enable interrupt requests received at another input 201 for another period of time. The interrupt decoder 24 may have one or more decoder outputs connected to the interrupt request processing unit 22, for outputting the selected interrupt request. The interrupt decoder may also output information to the interrupt request processing unit 22 about the received interrupt request, in order to enable the interrupt request processing unit 22 to update the information in the state memory 23 and/or to search in the state memory 23.

The interrupt controller 2 may be configured prior to operation or be configured dynamically. For instance, an external device, for example the processing unit 3, may store configuration data in the interrupt controller 2 prior to operation. Thereby, the interrupt controller 2 may be adapted to a wide range of possible applications without requiring extensive modifications. The configuration data may define possible states and the interrupt request belonging to the respective interrupt requests. For instance, the processing unit 3 or other device, may store data in the memory 23. The configuration data may further define other aspects, such as which interrupt controller inputs 200-206 may be used and/or the order of priority of the different types of interrupt requests. The external device may further dynamically adjust the interrupt controller 2 during operation. For instance, when a processing unit 3 is executing instructions, e.g. of a computer program, the processing unit 3 may adjust for instance the counters ICC1-ICC3 or the state stored in the state memory 236. Thereby, for instance, the interrupt controller 2 may be adapted to the amount of processing capacity available in the processing unit 3.

Furthermore, when after an interrupt request that has been rejected interrupt requests that belong to a state, from hereon referred to as correct interrupt requests, are received, these subsequent correct interrupt requests are granted and affecting the interrupt controller by the rejected interrupt request may be prevented. Accordingly, the interrupt controller 2 may exhibit a fault tolerant behavior. Furthermore, when the error causing the incorrect interrupt requests is a transient error, the interrupt controller 2 and the processing unit 3 will return to normal operation after rejecting the incorrect interrupt request. Accordingly, the arrangement 1 may continue to operate in its normal operation mode.

The processing arrangement 1 may for example be implemented in a electronic apparatus or system. The processing assembly 1 may for example be included in a control system, for example a control system for an apparatus, such as a vehicle control system which controls for instance a car or other motorised vehicle. For instance, FIG. 4 shows an example of vehicle 300 in which a processing assembly 1 is provided. The example shown in FIG. 4 includes an engine 302. An engine control node 313 is present which can control and monitor the engine 302. The vehicle further has break control nodes 314 which can control and monitor the breaks 301. The vehicle 300 has door lock control nodes 312 which can actuate the locking and unlocking of doors 303 of the vehicle 300. The nodes 312-314 are connected to a display node 311 via a connection 315. At the display 311, data can be outputted in a for humans perceptible form, for example informing an occupant of the vehicle whether or not the doors 303 are locked and or the rotations per minute (rpm) the engine is running. The nodes 311-314 are connected to the processing unit 3 and can transmit interrupt requests to the processing unit 3, for example to receive node control data or to transmit sensor data to the processing unit. The interrupt requests may subsequently be granted or rejected by the interrupt controller 2, as has been explained above in more detail. Since the interrupt controller 2 is present, an overload of the processing unit 3 by the interrupt requests can be prevented and accordingly the safety of the vehicle may be improved.

The invention may be implemented as a kit of parts. The kit may be provided as a set of separate components which can be connected to each other to assemble, for example an interrupt controller. The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a machine-readable medium.

The invention may also be implemented as data representing an integrated circuit or other hardware, for example as a set of data defining one or more masks suitable for a lithographic process. Also, the data may include configuration data for Field Programmable Gate Array (FPGA), a Complex Programmable Logic Device (CPLD) or other configurable hardware devices or for part of them. The configuration data can be stored in any type of memory usable by a system which can configure the configurable hardware device. The data may represent the hardware in any suitable manner and for example represent the date using a hardware description language or another functional description language. Additionally, the data may represent a circuit level model with logic and/or transistor gates. Furthermore, the data may represent a physical placement of various devices in a hardware model. The data may represent a hardware model, such as the data specifying the presence or absence of various features on different mask layers for masks used to produce the integrated circuit. The data may be stored in any form of a machine-readable medium.

The machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, (e.g., carrier waves, infrared signals, digital signals, etc.) or the like. The machine-readable medium may further include a data connection, such as a telephone cable or a wireless connection and/or a transmission over the Internet, electrical, optical, acoustical or other forms of propagated signals. However, the invention may also be implemented partially in specific hardware components that contain hardwired logic, or by a combination of programmed computer components and custom hardware components.

In the foregoing specification, the invention has been described with reference to specific examples of embodiments of the invention. It will, however, be evident that various modifications and changes may be made therein without departing from the broader spirit and scope of the invention as set forth in the appended claims. For example, the interrupt controller 2 may include a request priority processor which determines a priority of an interrupt request and grant the interrupt request or schedule the handling thereof based on the determined priority. Also, the processing unit 3 may for example include a microcontroller. The processing unit 3 may for example include a DSP controller, a sequencer, a computer, a distributed computer system, another interrupt controller. The processing unit 3 may also be a microprocessor and for example include a central processing unit (CPU) and/or a coprocessor and/or a digital signal processor and/or an embedded processor. The processing unit 3 may also include a microcontroller (µC).

Furthermore, the connections may be an type of connection suitable to transfer signals from or to the respective nodes, units or devices. The connections may for example be direction connections or indirect connections.

Furthermore, the processing unit 3 may be used in any suitable type of application and for example be implemented in a robot, a machine, an vehicle for transportation of good or persons such as a vessel, an airplane, or a wheeled vehicle (for example a car or other automobile). The processing unit 3 may for instance be a part of a (tele-)communication device, such as a mobile phone, or be used in any other suitable type of apparatus Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the interrupt controller 2 may be implemented as a number of separate, discrete devices connected to each other to form the interrupt controller. Also, for example, the memories 2226, 23, 236 may be implemented on separate devices to which e.g. a comparator and other components of the interrupt controller 2 are connected.

Also, devices functionally forming separate devices may be integrated in a single physical device. For example, the processing arrangement 1 may be implemented as a single integrated circuit. The interrupt controller 2 and/or the processing arrangement 1 may for example be implemented as a part of a System on a Chip (SoC) Also, for instance, the control logic unit 222 and/or the interrupt decoder 24 may be implemented as a single physical device, such as an integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. An interrupt request controller to control an interrupt request of at least one processing unit, said interrupt request requesting to switch a context of said processing unit or to switch said processing unit from a current operation to another operation, said interrupt request controller comprising:
   a controller input to receive the interrupt request;
   a request processing unit connected to said controller input, the request processing unit to decide whether to grant said received interrupt request based on at least one decision criterion;
   a controller output connected to said request processing unit, the controller output to provide information about at least one granted request;
   wherein said request processing unit includes:
      a control logic unit including:
         a state input to receive information about a current state in a logic flow of an application executing in said processing unit; and
         a request input to receive information about the received interrupt request;
      said control logic unit arranged to determine whether said received interrupt occurs too often, to determine whether said received interrupt request belongs to said current state of the logic flow of the application, to grant said received interrupt request in response to said received interrupt request belonging to said current state of the application and to reject said received interrupt request in response to the received interrupt request not belonging to said current state of the logic flow of the application;

said control logic unit further including a control logic output to provide a request grant signal in response to said received interrupt request being granted.

2. A request controller as claimed in claim 1, wherein said control logic unit is arranged to output, at said control logic output, an illegal request signal in response to said received interrupt request being rejected.

3. A request controller as claimed in claim 1, including:
a counter to count a number of granted interrupt requests;
a comparator to compare a counter value of said counter with a counter threshold value, wherein the comparator is arranged to grant said received interrupt request in case a difference between said counter value and said counter threshold value meets a request grant criterion.

4. A request controller as claimed in claim 3, including at least two counters, each to count a number of requests of a specific type.

5. A request controller as claimed in claim 3, including a counter controller connected to said counter and said comparator, the counter controller to perform a predetermined operation on said counter value in response to said received interrupt request being granted.

6. A request controller as claimed in claim 3, wherein said comparator is arranged to reject said received interrupt request in response to the difference between said counter value and said counter threshold value not meeting said request grant criterion and to output an request overflow signal in response to said request being rejected.

7. A request controller as claimed in claim 1, including: a current state indicator to indicate the state of the logic flow of the application and a state controller connected to said current state indicator, the state controller to change said current state to a next state.

8. A request controller as claimed claim 7, wherein said state controller is connected to said control logic unit to adjust said state indicator in response to an interrupt request being granted, based on a model of states of the logic flow of the application.

9. A request controller as claimed in claim 1, including: a state transition controller to determine allowed transitions from the current state to a next state and to determine whether said received interrupt request is associated with an allowed transition and to reject the received interrupt request in response to the received interrupt request not being associated with an allowed transition.

10. A request controller as claimed in claim 9, wherein said state transition controller is configured to grant said received interrupt request in response to said received interrupt request being associated with the allowed transition and one or more conditions for allowing said transition are fulfilled.

11. A request controller as claimed in claim 1, including at least two request controller inputs and an request decoder connected to said received interrupt request controller inputs to select, from two or more interrupt requests received during a same period of time, a selected interrupt request, said request decoder having a decoder output connected to said request processing unit to output said selected interrupt request.

12. A request controller as claimed in claim 1, wherein the control logic unit is further arranged to grant the particular interrupt in response to the particular interrupt not having occurred too often, and to reject the particular interrupt in response to the particular interrupt having occurred too often.

13. A request controller as claimed in claim 1, wherein the control logic unit further comprises:
a memory to store a control graph to identify interrupts not allowed in the current logic flow of the application.

14. A request controller as claimed in claim 13, wherein the control graph also identifies interrupts that occur too often.

15. A method for controlling requests of a processing unit, said requests requesting to switch a context of said processing unit or to switch said processing unit from a current operation to another operation, said method comprising:
receiving an interrupt request;
deciding whether to grant said received interrupt request based on at least one decision criterion;
outputting information about at least one granted interrupt request; and
receiving information about a current state of a logic flow of an application executing in said processing unit;
wherein receiving information about the received interrupt request includes:
determining whether a particular interrupt has occurred too often;
determining from said information whether said received interrupt request belongs to said current state of the logic flow in the application executing in the processing unit;
granting said interrupt request in response to said received interrupt request belonging to said current state of the logic flow of the application executing in the processing unit;
rejecting said received interrupt request in response to the received interrupt request not belonging to said current state of the logic flow of the application; and
outputting an request grant signal in response to said received interrupt request being granted.

16. A method as claimed in claim 15, further comprising:
granting the particular interrupt in response to the particular interrupt having not occurred too often; and
rejecting the particular interrupt in response to the particular interrupt having occurred too often.

17. A request controller to control a request of a processing unit in a vehicle control system, the request controller comprising:
a controller input to receive an interrupt request from a control node in a vehicle, the interrupt request for the processing unit in the vehicle control system;
a request processing unit connected to the controller input, the request processing unit to decide whether to grant the interrupt request based a decision criterion;
a controller output connected to the request processing unit, the controller output to provide information about a granted request;
wherein the request processing unit includes:
a control logic unit including:
a state input to receive information about a current state of a logic flow of an application executing in the processing unit, and
a request input to receive information about a received interrupt request;
the control logic unit arranged to determine whether a particular interrupt has occurred too often, to determine whether the received interrupt request belongs to the current state of the logic flow of the application, to grant the interrupt request in response to the received interrupt request belonging to the current state of the logic flow of the application, and to reject the interrupt request in response to the interrupt request not belonging to the current state of the logic flow of the application;

the control logic unit further including a control logic output to provide an request grant signal in response to the interrupt request being granted.

18. A request controller as claimed in claim 17, wherein the control logic unit is further arranged to grant the particular interrupt in response to the particular interrupt having not occurred too often, and to reject the particular interrupt in response to the particular interrupt having occurred too often.

19. A request controller as claimed in claim 17, wherein the control logic unit further comprises:

a memory to store a control graph to identify interrupts not allowed in the current logic flow of the application.

20. A request controller as claimed in claim 19, wherein the control graph also identifies interrupts that occur too often.

\* \* \* \* \*